(12) United States Patent
Pfeffer et al.

(10) Patent No.: US 11,339,489 B2
(45) Date of Patent: May 24, 2022

(54) CATHODE BLOCK HAVING A SLOT GEOMETRY

(71) Applicant: Tokai COBEX GmbH, Wiesbaden (DE)

(72) Inventors: Markus Pfeffer, Meitingen (DE); Florian Pfefferer, Meitingen (DE)

(73) Assignee: Tokai COBEX GmbH, Wiesbaden (DE)

( * ) Notice: Subject to any disclaimer, the term of this patent is extended or adjusted under 35 U.S.C. 154(b) by 305 days.

(21) Appl. No.: 16/307,586

(22) PCT Filed: Jun. 14, 2017

(86) PCT No.: PCT/EP2017/064581
§ 371 (c)(1),
(2) Date: Dec. 6, 2018

(87) PCT Pub. No.: WO2017/216243
PCT Pub. Date: Dec. 21, 2017

(65) Prior Publication Data
US 2019/0301033 A1    Oct. 3, 2019

(30) Foreign Application Priority Data

Jun. 15, 2016  (DE) .................... 10 2016 210 693.7

(51) Int. Cl.
*C25C 3/08* (2006.01)
*C01B 32/20* (2017.01)
*C25C 3/16* (2006.01)

(52) U.S. Cl.
CPC ............. *C25C 3/08* (2013.01); *C01B 32/20* (2017.08); *C25C 3/16* (2013.01)

(58) Field of Classification Search
CPC .... C25C 3/06; C25C 3/08; C25C 3/16; C25C 7/00–7/08
See application file for complete search history.

(56) References Cited

U.S. PATENT DOCUMENTS

| 3,398,081 A | 8/1968 | Bonfils et al. | |
| 4,031,615 A * | 6/1977 | Dumas | C25C 3/08 373/128 |
| 2001/0018040 A1 | 8/2001 | Ottinger et al. | |

(Continued)

FOREIGN PATENT DOCUMENTS

| CH | 663624 A | * 12/1987 | .............. C25C 3/08 |
| CH | 663624 A5 | 12/1987 | |
| DE | 2405461 A1 | 8/1974 | |

(Continued)

OTHER PUBLICATIONS

Tranlsation of EP-0117842-A1 (Year: 2020).*

(Continued)

*Primary Examiner* — Alexander W Keeling
(74) *Attorney, Agent, or Firm* — Maier & Maier, PLLC (57) ABSTRACT

Disclosed is a cathode block having a slot geometry, said carbon-based cathode block for an electrolysis cell for the production of aluminium being provided with at least one slot for accommodating at least one cathode bar, said at least one slot having at least one cavity, at least some sections of which extend in the longitudinal direction of the slot and which includes at least one undercut.

18 Claims, 8 Drawing Sheets

(56) References Cited

U.S. PATENT DOCUMENTS

2013/0319853 A1* 12/2013 Hiltmann .................. C25C 7/02
204/294

FOREIGN PATENT DOCUMENTS

| DE | 10003927 A1 | 8/2001 |
| DE | 102011004009 A1 | 8/2012 |
| DE | 102013207737 A1 | 10/2014 |
| EP | 0117842 A1 * | 9/1984 | ............... C25C 3/16 |
| EP | 0117842 A1 | 9/1984 |
| SU | S65023 A1 | 5/1979 |

OTHER PUBLICATIONS

Translation of CH-663624-A (Year: 2020).*
International Search Report with English translation and Written Opinion of the International Search Authority dated Sep. 11, 2017 of corresponding International application No. PCT/EP2017/064581; 15 pgs.

* cited by examiner

CATHODE BLOCK HAVING A SLOT GEOMETRY

FIELD

The invention relates to a cathode block on the basis of carbon having a novel slot geometry, to a cathode bottom for an aluminium electrolysis cell comprising said cathode blocks and to an electrolysis cell containing said cathode bottoms.

BACKGROUND

Aluminium is generally produced by means of fused-salt electrolysis in what are known as electrolysis cells. An electrolysis cell generally comprises a tank made of iron sheet or steel, the bottom of which is lined with a thermal insulation. In this tank, up to 28 cathode blocks made of carbon or graphite which are connected to the negative pole of a current source, form the bottom of a further tank, the walls of which consist of side blocks of carbon, graphite or silicon carbide. A gap is formed between two cathode blocks in each case. The arrangement of cathode blocks and optionally filled gaps is generally known as the cathode bottom. The gaps between the cathode blocks are conventionally filled with a ramming mass of carbon and/or graphite on the basis of coal tar. This serves to seal against fused constituents and to compensate for mechanical tensions during operation. Carbon blocks which hang on a supporting structure connected to the positive pole of the current source typically serve as the anode.

In such an electrolysis cell, a molten mixture of aluminium oxide (Al2O3) and cryolite (Na3AlF6), preferably approximately 2 to 5% aluminium oxide, approximately 85 to 80% cryolite and further additives, is subjected to fused-salt electrolysis at a temperature of approximately 960° C. The dissolved aluminium oxide herein reacts with the solid carbon anode and forms liquid aluminium and gaseous carbon dioxide. The melt mixture covers the side walls of the electrolysis cell with a protective crust, whilst aluminium, due to its greater density as compared with the density of the melt, collects on the bottom of the electrolysis cell under the melt and is thus protected against re-oxidation by atmospheric oxygen or carbon dioxide. The aluminium thereby produced is periodically removed from the electrolysis cell and further processed.

During electrolysis, the anode is consumed, whereas the cathode bottom remains largely chemically inert during the electrolysis. The anode is therefore an expendable part which is often exchanged during the operational life, whereas the cathode bottom is designed for long-term and lasting use. However, present-day cathode bottoms are subject to wear. As a result of the aluminium layer moving over the cathode bottom, mechanical wear of the cathode surface takes place. Additionally, through aluminium carbide formation and sodium incorporation, (electro)chemical corrosion of the cathode bottom takes place. Since, usually, 100 to 300 electrolysis cells are connected in series in order to create an economical plant for the production of aluminium, and such a plant is to be used, typically, for at least 4 to 10 years, the failure and replacement of a cathode block in an electrolysis cell in such a plant can be expensive and require complex repairs which severely reduce the profitability of the plant.

For the operation of the electrolysis cell, the cathode blocks each have at least one slot for receiving at least one cathode bar in each case, through which current fed in via the anodes is conducted away. In this case, the cathode bars can consist of steel, copper, other electrically conductive metals, metal alloys or metal composites, preferably of steel. The intermediate spaces between the individual walls of the cathode blocks delimiting defining the slots and the cathode bar are normally cast from cast iron, by means of which a cast iron-cathode bar combination is formed. Through this filling of the slot, it is ensured that during operation, the cathode bar is connected electrically and mechanically to the cathode block. This casting-in process is also known as "rodding". Following this process step, the assembly consisting of cathode bar, cast iron and cathode block is rotated by 180° into what is known as the operating position and is installed in a cell. The operating position should be understood in the context of this invention to mean that the opening of the slot for the cathode bar points downwardly. This is then brought to an operating temperature of approximately 960° C. and then continuously operated for several years.

With regard to the possibility of the bus bar falling out during rotation into the operating position or during installation, it is known that the slot geometry has an influence thereon. With a dovetail-shaped slot form (see FIGS. 1a and 1b), the falling out of the cast-in cathode bar is prevented, since due to the dovetail-shaped slot, the cathode bar-cast iron combination is clamped in the slot. In this case, however, due to the different coefficients of thermal expansion (CTE) of the cathode bar-cast iron combination as compared with the cathode block, having a factor of approximately 3 to 5, an air gap of 0.5 to 10.0 mm forms between the cathode bar-cast iron combination and the base of the slot of the cathode block following cooling after the rodding process and the rotation of the arrangement for installation. The coefficient of thermal expansion (CTE) is a characteristic of the thermal expansion and describes the behaviour of a substance with regard to the change of its dimensions as the temperature changes. The CTE is measured in accordance with ISO 14420 dated 1 Jul. 2005.

On heating to operating temperature, an expansion of the cathode bar-cast iron combination takes place, so that a mechanical pressure is exerted on the less strongly expanding cathode block. This occurs to a greater extent on the side walls of the slot and to a lesser extent on the base of the slot of the cathode block. As a result, cracks can arise in the cathode block, which leads to liquid aluminium or melt being able to penetrate into the block, and thus ultimately to the operating life of the cathode block being reduced.

The slot typically has three walls defining the cathode block. Of these, in the case of a rectangular slot, the wall extending parallel to the operational side of the cathode block is designated the base of the slot. The operational side of the cathode block is understood to be that side of the cathode block which comes into contact with the aluminium melt. The walls of the slot extending parallel to the long sides of the cathode are designated the side walls. The designations for the walls defining the slot as side walls and the base of the slot apply in principle for all slot shapes with the exception of the round slot in which this distinction is of course not possible.

As a consequence of the low contact pressure against the base of the slot as compared with the side walls, the contact resistance on the base of the slot is always far greater than at the lateral faces of the cathode block. In the case of an air gap of 0.5 mm in the cold state, the contact resistance on the base of the slot at approximately 250 Ωmm2 (measured at an operating temperature of 800 to 950° C.) is approximately 25 times as great as on the side walls of the slot of the cathode block at approximately 10 Ωmm2. The contact resistance is understood to be the electrical resistance between two mutually abutting electrical conductors. This can be determined as the difference between the overall resistance and the sum of the individual resistances of such an arrangement, wherein the resistances themselves are determined using typical methods, such as the current-voltage measurement. Gap dimensions of 1.5 mm in the cold condition are sufficient so that during operation, on an ongoing basis, there is no contact with the base of the slot. The cathodic resistance of a cell is approximately 10% higher in the absence of contact with the base of the slot than where contact exists. The cathodic resistance of a cell should be understood to be the electrical resistance which results during a current flow through the cathode block starting from the operational side of the cathode block unit it leaves the cathode block via the cathode bars as far as the outside of the end faces. By raising the cathodic resistance, the cathode voltage drop (CVD) is increased accordingly by up to 10%. The cathode voltage drop is determined by the cathode block material used, the cathode bar-cast iron combination and the contact resistance between these two components. A raised CVD results in a higher cell voltage and thus also a higher specific energy consumption per mass of aluminium produced.

A further disadvantage is that through the incorporation of sodium into the cathode bottom, as a result of diffusion from the melt of cryolite (Na3AlF6), the cathode block geometry is expanded, whereby the slot geometry is also expanded. This has the result that air gaps are created or enlarged, or the contact pressure of the cathode bar-cast iron combination is lessened, so that a greater contact resistance and thus also a higher CVD results.

In order to achieve a low electrical resistance and a low transfer resistance between the bus bar or the cast iron and the cathode block, DE 10 2011 004 009 discloses a cathode block in which at least one slot is covered in certain regions with a graphite foil, wherein in the at least one slot, at least one bus bar is provided which has a covering of cast iron at least in certain regions, and wherein at least one depression is provided in the wall of the cathode block defining the at least one slot, wherein the covering of cast iron engages at least in some portions in the at least one depression. In this case, a firm mechanical connection is achieved between the bus bar covered with cast iron and the cathode block, which counteracts the bus bar falling out of the slot lined with graphite foil. These depressions can have a semicircular, triangular, rectangular or trapezoidal cross-section, wherein in the case of the trapezoidal cross-section, the longer base side of the trapezoid is located on the surface of the wall of the slot.

CH 663624 discloses a cathode block in which the bus bar is introduced with a press-fit, wherein the cathode block has elevations over the whole surface of the slot. These elevations can have a triangular, rectangular, square or trapezoidal or sinusoidal cross-section, wherein in the case of the trapezoidal cross-section, the longer base side of the trapezoid is located on the surface of the wall of the slot. With this cathode block, the electrical transfer resistance between the bus bar and the cathode block is to be reduced; since the bus bar is arranged with a press-fit, no cast iron is used.

SUMMARY

It is therefore an object of the present invention to provide an alternative cathode block for an aluminium electrolysis cell which, during operation of the electrolysis cell, has a low electrical resistance and, in particular, also continuously over an extended electrolysis time period, and in particular also has a low contact resistance between the cathode bar or the cast iron and the cathode block. In addition, due to the lower contact resistance, the cathode block also has a lower cathode voltage drop, as a result of which the energy loss in the cell and the specific energy consumption per mass of aluminium produced is lower.

The object is achieved by means of a cathode block on the basis of carbon for an electrolysis cell for producing aluminium, having at least one slot for receiving at least one cathode bar, wherein the at least one slot has at least one recess extending at least in portions in its longitudinal direction, with at least one undercut.

Figure 1A:
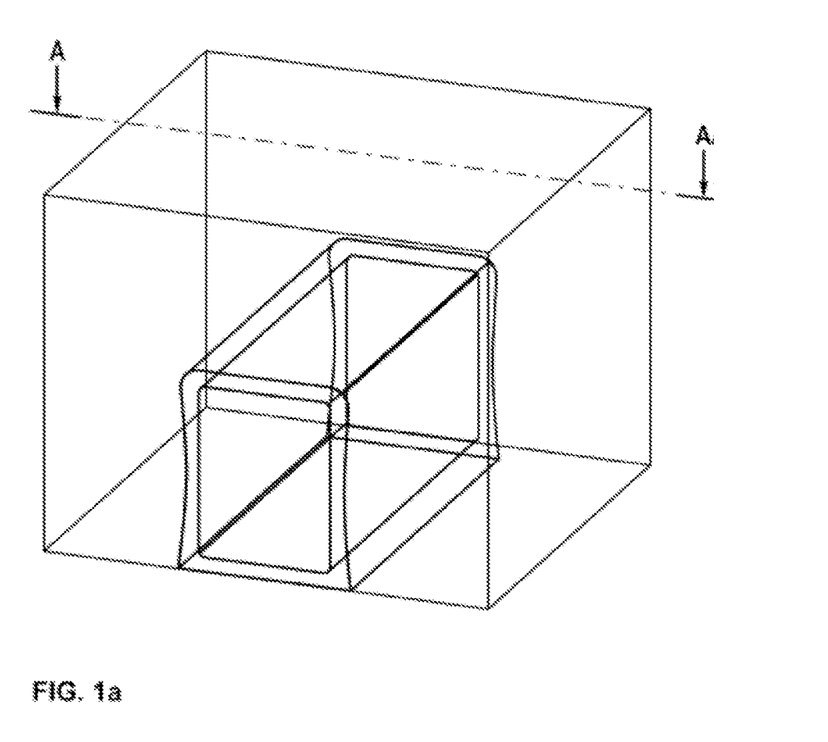
FIG. 1a shows a perspective view of a cathode block brought into the operating position, having a cathode bar cast in with cast iron.

A recess extending in the longitudinal direction should be understood in that it extends from one of the narrow sides of the cathode block to the other narrow side of the cathode block, i.e. between what are known as its end faces (see FIG. 1a). A recess extending at least in some portions in the longitudinal direction means that the recess does not necessarily have to extend over the entire length of the cathode block, but can also be present only in some portions. Advantageously, the cathode block has either at least one recess that is continuous over the cathode length and/or two to eight recess portions, wherein preferably two to three recess portions are present. The recesses in portions have the advantage that the current flow through the cathode block can be influenced locally in a targeted manner. The maximum length of the recess portions is advantageously ⅓ of the cathode length for two recess portions and at least ¹⁄₂₀ of the cathode length for eight recess portions. With more than eight recess portions, there is no longer any difference from a continuous recess over the entire length, and in the case of more than eight recess portions, it is technically easier to use a continuous recess.

Seen in cross-section, that is to say, when looking at the end faces of the cathode block, the cathode block has at least one recess, wherein the number of recesses is dependent upon the size of the recesses and the spacing between two recesses is advantageously at least 10 mm greater than the sum of the radii of the circles of the adjacent recesses.

In the context of this invention, a mould is considered to be a recess with an undercut which leads thereto that after filling the recess with, for example, liquid cast iron, the solidified cast iron cannot be removed from the recess without destroying the mould. In this case, removal by displacement in the longitudinal direction of the cathode block is not considered.

This is described below with the example of a recess with an undercut (see FIG. 2), without restricting the invention. According to the embodiment in FIG. 2 of a cathode block in cross-section, the recess (5, 5') has, for example, an opened circle with a diameter of 50 mm and a width of the opening of the circle toward the slot of 10 mm. Thus, the diameter of the opened circle is greater than the opening width of the opened circle. Following hardening of the poured in cast iron, due to this shape of the recess, the cast iron cannot fall out of the recess or be removed from the recess without destruction. The hardened cast iron is thus fixed in the mould as a result of the shape of the recess, that is to say, due to the undercut which is present.

Due to the recess with the undercut, an improved anchoring and positioning of the cathode bar in the slot is achieved, so that the air gap which arises, following the cooling of the rodding process and the rotation of the cathode block into the operating position, between the cathode bar-cast iron combination and the cathode block, is reduced to less than 0.5 mm. This reduction leads, on heating of the cathode block to the operating temperature of the electrolysis cell, to a reduction of the contact resistance to 1 to 3 Ω-mm2 at the base of the slot, which corresponds to an improvement of 8 to 25 times. This in turn leads to a lower cathode voltage drop (CVD) of 20-50 mV. The reduced cathode voltage drop results in an energy loss in the cell that is 1 to 2% lower and thus also in a specific energy consumption per mass of aluminium produced that is 1 to 2% lower.

Advantageously, the at least one recess extending in the longitudinal direction has the form in cross-section of a circle which is opened toward the slot or of a circle which is opened toward the slot and has a shaft, wherein the opening is configured to be smaller than the diameter of the circle. The cross-section should be understood to be a representation of the cut surface of a body cut through perpendicularly to the longitudinal axis. The circular part of the recess reduces the mechanical tensions since the forces acting are distributed evenly over the circular form, and contact pressure over the whole surface is enabled.

According to a further preferred embodiment of the present invention, the opened circle of the at least one recess or the opened circle of the at least one recess with a shaft having a width of from 5 to 60 mm, preferably from 10 to 45 mm, particularly preferably from 15 to 30 mm. If the width of the shaft is greater than 5 mm, the cast iron flows more easily into the recess, so that it can be filled completely. In a case where the shaft has a width of more than 60 mm, there is no longer a recess with an undercut.

Advantageously, the shaft of the at least one recess has a depth of from 3 to 30 mm, preferably from 5 to 20 mm, particularly preferably from 10 to 15 mm. In the context of this invention, the depth is regarded as the length of the shaft of the recess from the slot in the direction of the outer sides of the cathode block. If the depth of the shaft is greater than 30 mm, excessive tensile stresses arise, which cause the cathode block to start tearing apart. If the depth of the shaft is less than 3 mm, excessive tensile stresses arise at the circle opening, which cause the cathode block to start breaking apart. Cracks in the cathode block lead to a reduced operating life of the cathode block or even to a complete failure of the electrolysis cell.

Advantageously, in the shaft of the at least one recess, in cross-section, the walls extend parallel or not parallel to one another, particularly preferably parallel.

According to a further preferred embodiment of the present invention, the shaft of the at least one recess extends, starting from the circle opening perpendicularly toward the slot, in a narrowing or widening manner. Narrowing should be understood to mean that the width of the shaft from the opening of the circle toward the slot becomes smaller, and widening should be understood to mean that the width becomes greater.

According to yet another preferred embodiment of the present invention, the at least one recess extending in the longitudinal direction has an overall depth as viewed over the length of the cathode block, which varies in relation to the base of the slot, and the at least one recess has a smaller overall depth at the longitudinal ends of the cathode block than in the middle of the cathode block. This varying overall depth has the advantage that the overall volume of the slot is reduced, and thus the cast iron requirement is reduced. In addition, fewer thermal stresses arise, which in turn reduces the risk of cracks due to the lower contact pressure of the cast iron on the cathode block.

According to yet another preferred embodiment of the present invention, the at least one recess extending in the longitudinal direction has an overall depth of from 5 to 80 mm, preferably from 10 to 50 mm, particularly preferably from 15 to 35 mm. The overall depth of the recess of from 5 mm to 80 mm permits problem-free and complete filling of the recess with cast iron, which increases the mechanical stability of the filled recess. With an overall depth of greater than 80 mm, tensile stresses which reduce the stability increasingly arise. With an overall depth of less than 5 mm, the advantageous effects no longer arise because the surfaces and geometries are too small.

Advantageously, the at least one recess is located in the base of the slot and/or in the slot radius of the slot and/or touches the slot radius of the slot.

Figure 1B:
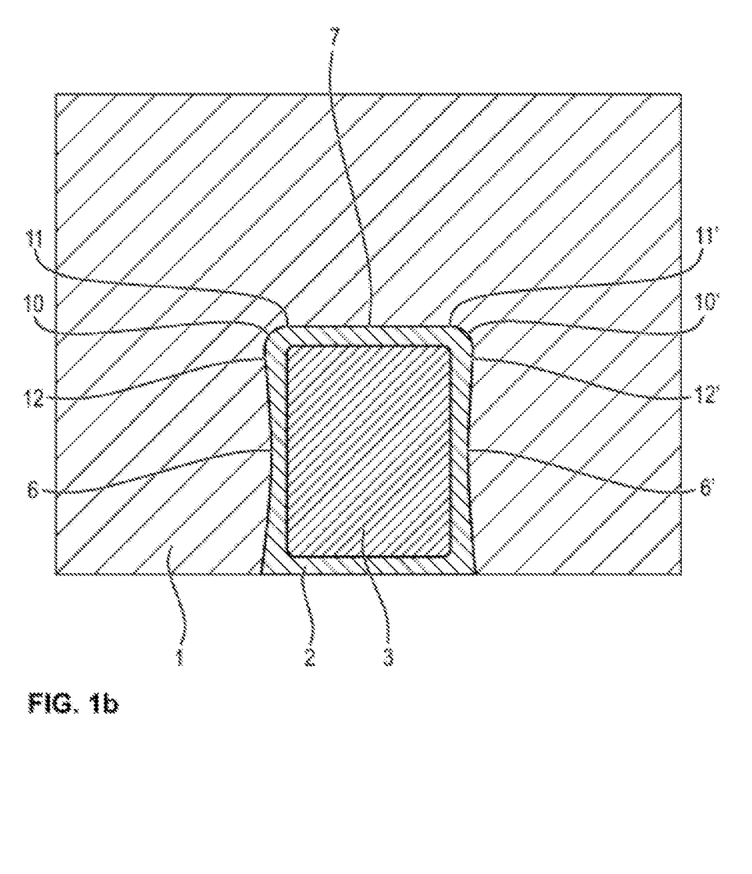
FIG. 1b shows a cross-section (sectional view of FIG. 1a through the line A) of a cathode block brought into the operating position, having a cathode bar cast in with cast iron.

In the context of this invention, the slot radius is used to mean the transition region between the side wall of the slot and the base of the slot. FIG. 1b shows a slot in cross section wherein the transition region (11, 11') denotes the start of this region and (12, 12') denotes the end of the transition region. By means of the transition region, stresses and cracks resulting therefrom are minimised. By means of the selected arrangement of the recesses, an optimal anchoring of the cathode bar-cast iron combination on the base of the slot is enabled, by means of which improved contact between the cathode bar-cast iron combination and the cathode block is achieved.

Advantageously, the minimum spacing between the centre points of the opened circles is at least 10 mm greater than the sum of the radii of the circles of the adjacent recesses. If the spacing between the centre points of the opened circles is smaller, this results in a worsening of the mechanical stability due to crack formation.

According to a further preferred embodiment of the present invention, the at least one recess is filled with cast iron or a combination of conductive metal, preferably copper, and cast iron. The conductive metal generates a homogenization of the current distribution along the cathode. In addition, the contact pressure of the cathode bar on the base of the slot during operation is increased by the greater expansion of the conductive metal relative to the carbon material of the cathode. In the context of this invention, steel, copper, other electrically conductive metals, metal alloys or metal composites, preferably steel or copper, are considered as the conductive metal.

According to yet another embodiment of the present invention, the cast iron has a carbon content of greater than 2.0 wt %, preferably greater than 2.5 wt %, particularly preferably greater than 3.0 wt %, a silicon content of greater than 1.8 wt %, preferably greater than 2.0 wt %, particularly preferably greater than 2.5 wt % and a phosphorus content of greater than 0.5 wt %, preferably greater than 0.8 wt % and particularly preferably greater than 1.0 wt %. According to Wilkening and Cote in "Problems of the Stub-Anode Connection" (Light Metals 2007, pp. 865-873), the carbon saturation level Sc for cast iron is given by Sc=% C/(4.23−0.312Si−0.33P+0.066 Mn) %, where % C is the carbon content, and Si, P, Mn are the content of the corresponding elements. Under certain circumstances, hypereutectic carbon concentrations (supersaturation) are possible, wherein Sc can be greater than 1.

In the context of the invention, it is advantageous if the at least one recess is at least 50% filled, preferably at least 80%, particularly preferably at least 90% and most preferably 100% filled with cast iron. In the event of a filling of less than 50%, the formation of air gaps and the loss of the contact pressure can arise, which results in a worsening of the contact between the cathode bar-cast iron combination and the cathode block.

According to yet another preferred embodiment of the present invention, the at least one recess is up to 10% filled, preferably up to 25%, particularly preferably up to 50% filled with a conductive metal which has a greater electrical conductivity than cast iron. The still unfilled part of the recess is filled with cast iron up to a fill level of 100%. By means of the filling with the conductive metal, a homogenization of the current distribution along the cathode is achieved. At more than 50%, filling the remaining volume with cast iron is severely impeded. In the case of filling less than 10% of the recess with a conductive metal, the effect of the homogenisation of the current distribution does not occur.

Preferably, the conductive metal of the filling is in the form of a foil or a rod. The use of a rod or a foil enables an economical method and a simplification of the production as compared with the pouring in of a conductive metal, for example, copper.

Advantageously, the conductive metal foil has a thickness of from 0.2 to 3.0 mm, preferably from 0.5 to 2.0 mm, particularly preferably from 0.8 to 1.5 mm.

According to a further preferred embodiment of the present invention, the conductive metal rod has the form in cross-section of a rectangle or a triangle or of a circle or a segment of a circle. In the context of this invention, a segment of a circle should be understood to be the partial area of a circle which is delimited by a circular arc and a chord. This includes, for example, a form that is semicircular in cross-section.

According to yet another preferred embodiment of the present invention, the conductive circular metal rod has a diameter of from 10 to 40 mm, preferably from 15 to 30 mm, particularly preferably from 20 to 25 mm.

Preferably, the at least one slot for receiving the cathode bar is rectangular or dovetail-shaped in cross-section, preferably dovetail-shaped.

Advantageously, the at least one slot of the cathode block has a varying depth and the slot has a smaller depth at the longitudinal ends of the cathode block than in the middle of the cathode block. As a result, during operation of the electrolysis cell, a homogeneous vertical current distribution is achieved over the cathode block length, by means of which the increased wear at the cathode block ends is reduced and thus the operating life of the cathode is increased.

According to a further preferred embodiment of the present invention, the at least one slot is lined at least in part from the longitudinal ends of the cathode block over ⅓ of the cathode length in each case, preferably over the entire length, with a graphite foil. The graphite foil can be glued in with graphite adhesive, for example, an artificial-resin-based, graphite-filled adhesive, firmly clamped, or even simply put in place.

The graphite foil can contain a graphite selected from the group consisting of natural graphite, synthetic graphite or expanded graphite. Expanded graphite can be obtained, for example, as disclosed in DE10003927 A1.

According to a further preferred embodiment of the present invention, the graphite foil preferably consists of an expended graphite or contains at least partially expanded graphite. The use of such a graphite foil leads to a more uniform current distribution along the cathode block and lessens the mechanical loading of the slot, since the graphite foil enables, through the property of compressibility, lasting contact between the cathode bar-cast iron combination and the cathode block. In addition, where a graphite foil is used, the contact resistance is lessened, since the effective contact area is greater due to the adaptation of the graphite foil to the surface structure of the cathode block and of the cast iron layer.

Advantageously, the graphite foil has a thickness of between 0.2 and 3.0 mm, preferably between 1.0 and 3.0 mm, and particularly preferably between 1.5 and 2.0 mm. Only from a thickness of 0.2 mm and greater is the contact resistance lessened, since the contact area is enlarged by the graphite foil. At a thickness of greater than 3.0 mm, the handling of the graphite foil is made more difficult due to its restricted malleability.

It is also advantageous that the graphite foil has a density of from 0.04 to 1.3 g/cm3, preferably 0.2 to 0.5 g/cm3 and particularly preferably 0.3 g/cm3.

According to yet another preferred embodiment of the present invention, the cathode block is composed of a material which contains at least 50 wt % carbon, preferably at least 70 wt %, particularly preferably at least 90 wt % and most particularly preferably at least 99 wt %.

In this case, the carbon can be selected from the group consisting of amorphous carbons, graphitic carbons, graphitised carbons and any desired mixtures of two or more of the aforementioned carbons.

The present invention further relates to a cathode bottom which contains at least one cathode block as described above. Preferably, a cathode bottom contains 8 to 36 of the cathode blocks as described above.

Furthermore, the present invention relates to an electrolysis cell for the production of aluminium which contains at least one cathode bottom as described above.

BRIEF DESCRIPTION OF THE DRAWINGS

The present invention will be described in the following, purely by way of example, on the basis of advantageous embodiments and with reference to the accompanying drawings.

DETAILED DESCRIPTION

FIG. 1a shows a perspective view of a cathode block brought into the operating position, having a cathode bar cast in with cast iron.

FIG. 1b shows the cross-section (sectional view of FIG. 1a through the line A) of a cathode block (1) brought into the operating position, having a cathode bar (3) cast in with cast iron. The cathode bar (3) is located in the slot (2) which is formed by the side walls of the slot (6, 6') and the base of the slot (7) and is surrounded by cast iron. The form of the slot shown is a dovetail shape. The transition region of the slot radius (10, 10') is delimited by the transition region between the start (11, 11') and the end (12, 12').

Figure 2:
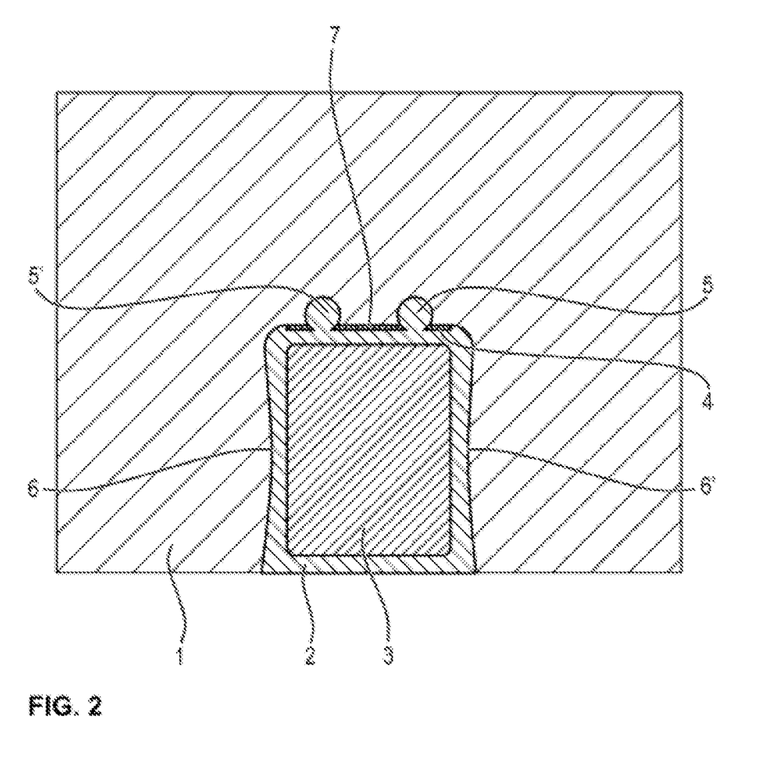
FIG. 2 shows a cross-section of a cathode block brought into the operating position, having a cathode bar cast in with cast iron.

FIG. 2 shows the cross-section of a cathode block (1) brought into the operating position, having a cathode bar (3) cast in with cast iron. The cathode bar (3) is located in the slot (2) which is formed by the side walls of the slot (6, 6') and the base of the slot (7) and is surrounded by cast iron. Located on the base of the slot (7) is a graphite foil (4) and two recesses with undercuts (5, 5').

Figure 3:
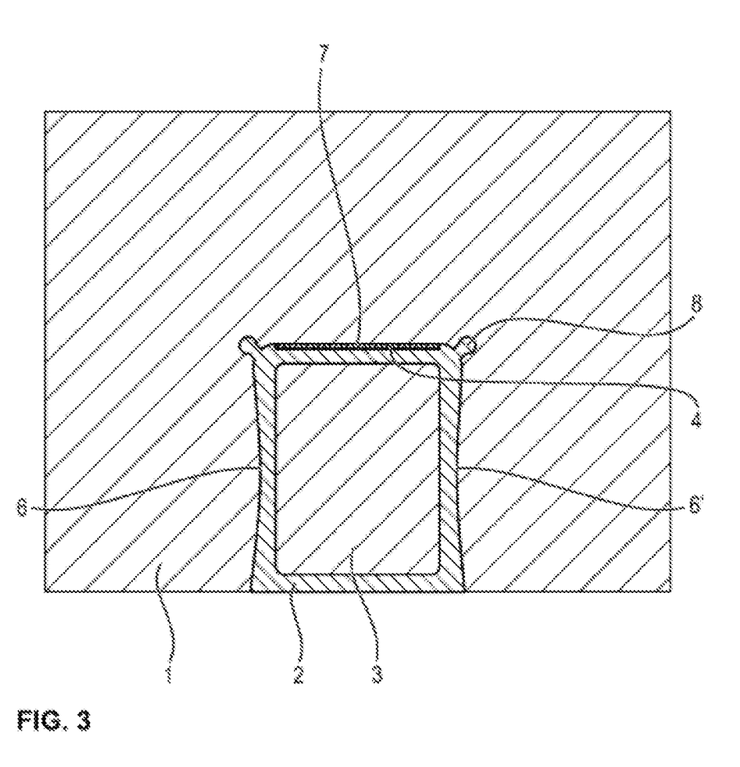
FIG. 3 shows a cross-section of a further embodiment of a cathode block according to the invention brought into the operating position, having a cathode bar cast in with cast iron.

FIG. 3 shows the cross-section of a cathode block (1) brought into the operating position, having a cathode bar (3) cast in with cast iron. The cathode bar (3) is located in the slot (2) which is formed by the side walls of the slot (6, 6') and the base of the slot (7) and is surrounded by cast iron. Located on the base of the slot (7) is a graphite foil (4). The two recesses with undercuts and shaft (8) are located in the slot radii on the base of the slot (7).

Figure 4:
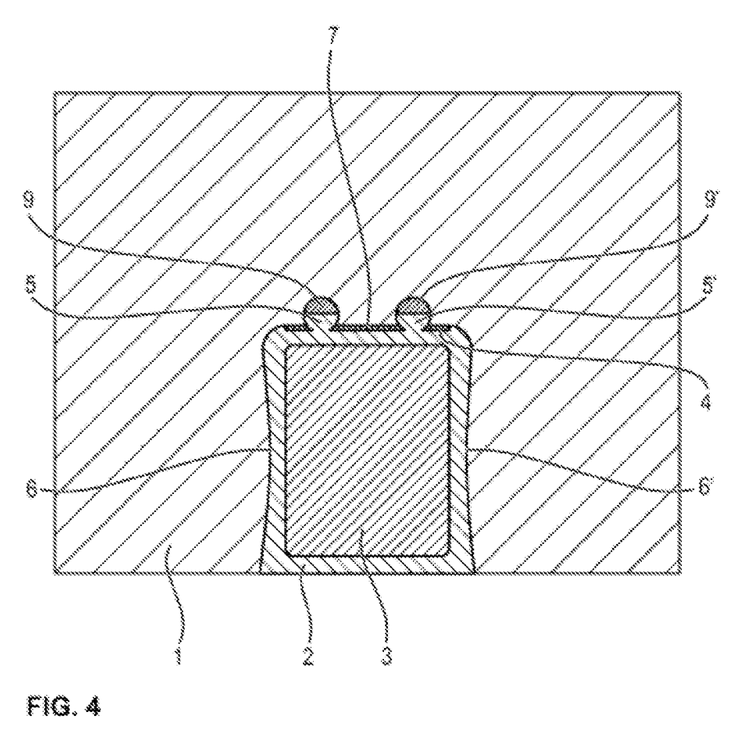
FIG. 4 shows a cross-section of a further embodiment of a cathode block according to the invention brought into the operating position, having a cathode bar cast in with cast iron.

FIG. 4 shows the cross-section of a cathode block (1) brought into the operating position, having a cathode bar (3) cast in with cast iron. The cathode bar (3) is located in the slot (2) which is formed by the side walls of the slot (6, 6') and the base of the slot (7) and is surrounded by cast iron. Located on the base of the slot (7) is a graphite foil (4) and two recesses with undercuts (5, 5'), which have a copper filling (9, 9'). The copper filling has been poured in as liquid.

Figure 5:
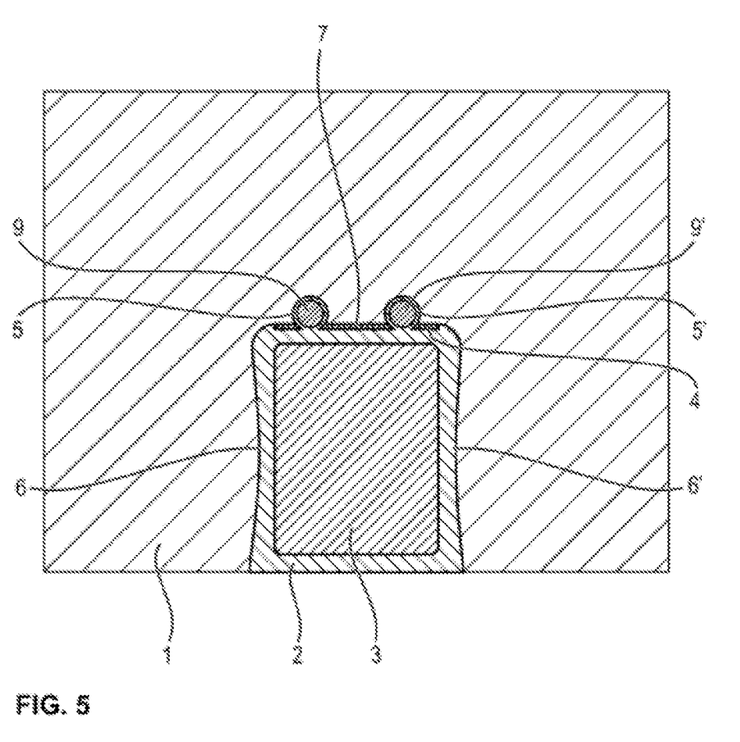
FIG. 5 shows a cross-section of a further embodiment of a cathode block according to the invention brought into the operating position, having a cathode bar cast in with cast iron.

FIG. 5 shows the cross-section of a cathode block (1) brought into the operating position, having a cathode bar (3) cast in with cast iron. The cathode bar (3) is located in the slot (2) which is formed by the side walls of the slot (6, 6') and the base of the slot (7) and is surrounded by cast iron. Located on the base of the slot (7) is a graphite foil (4) and two recesses with undercuts (5, 5') which have a copper rod (9, 9'), which is circular in cross-section, as a filling.

Figure 6:
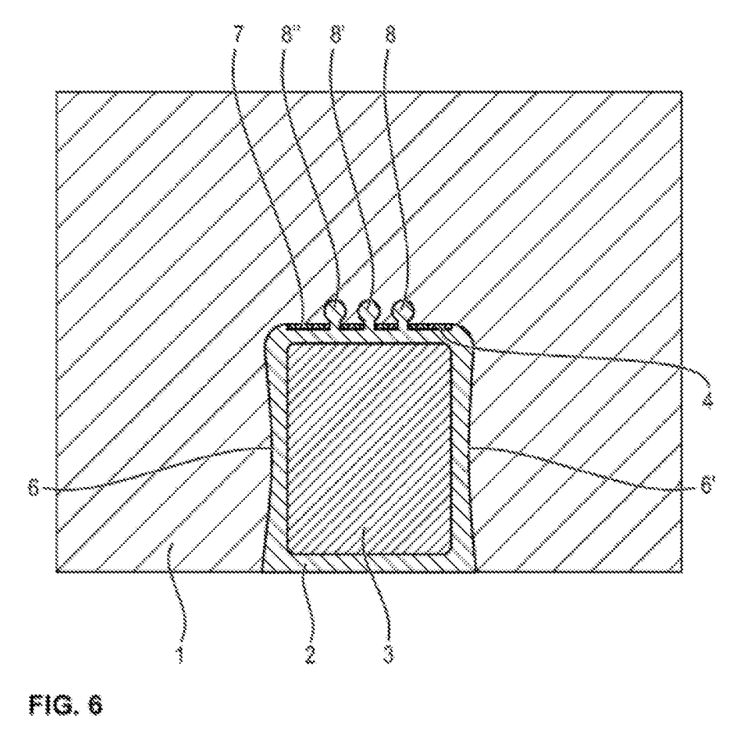
FIG. 6 shows a cross-section of a further embodiment of a cathode block according to the invention brought into the operating position, having a cathode bar cast in with cast iron.

FIG. 6 shows the cross-section of a cathode block (1) brought into the operating position, having a cathode bar (3) cast in with cast iron. The cathode bar (3) is located in the slot (2) which is formed by the side walls of the slot (6, 6') and the base of the slot (7) and is surrounded by cast iron. Located on the base of the slot (7) is a graphite foil (4) and three recesses with undercuts and a shaft (8).

Figure 7:
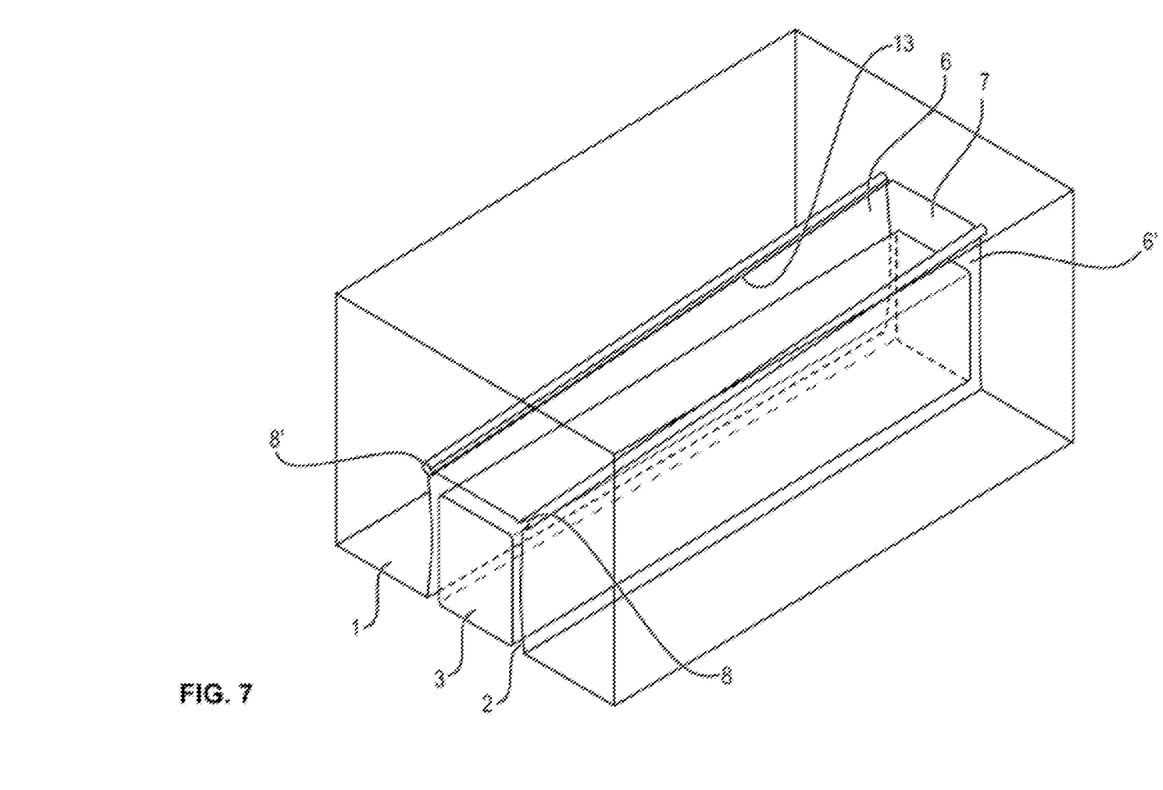
FIG. 7 shows a perspective view of a half of a cathode block brought into the operating position, wherein the slot has a varying depth and the slot has a smaller depth at the longitudinal end of the cathode block than in the middle of the cathode block.

FIG. 7 shows a perspective view of a half of a cathode block brought into the operating position, wherein the slot has a varying depth and the slot has a smaller depth at the longitudinal end of the cathode block than in the middle of the cathode block. The cathode bar (3) is located in the slot (2) which is formed by the side walls of the slot (6, 6') and the base of the slot (7) and is surrounded by cast iron. The two recesses with undercuts and shaft (8) are arranged in the slot radii on the base of the slot, i.e. in the transition between the side walls (6, 6') and the base of the slot (7). The slot (2) has a smaller depth at the longitudinal ends of the cathode block than in the middle of the cathode block, i.e. it is a slot with a varying depth (13).

The present invention will be illustrated in the following on the basis of exemplary embodiments, wherein the embodiments do not represent restrictions of the invention.

Exemplary Embodiment 1

In the cathode block with external dimensions 530×410× 3360 mm3 (width (W)×height (H)×length (L)), a dovetail-shaped slot was milled with a width of 180 mm at the base of the slot and the slot opening, narrowing to 165 mm at half the height between the base of the slot and the slot opening and with a slot radius of 20 mm. Two recesses with undercut were milled symmetrically in the base of the slot at a spacing of 80 mm. For this purpose, a spherical cutter with a ball diameter of 30 mm was used, wherein the ball was only immersed into the material to a depth of 25 mm. As a result, the circular opening of the recess is less than the diameter and forms an undercut. The graphite foil with a thickness of 2 mm was cut to size with the dimensions 50×3360 mm 2 (W×L) and laid onto the base of the slot of the block starting from the longitudinal end. The recess was closed at the longitudinal ends of the block with 150 g of cathode material. Subsequently, the cathode bar was placed in the slot and sealed with 350 kg cast iron.

Exemplary Embodiment 2

In the cathode block with external dimensions 530×410× 3360 mm3 (width (W)×height (H)×length (L)), a dovetail-shaped slot was milled with a width of 180 mm at the base of the slot and the slot opening, narrowing to 165 mm at half the height between the base of the slot and the slot opening and with a slot radius of 20 mm. On the base of the slot, two recesses with undercuts were milled into the two slot radii at a 45° angle of the cathode block. This form was created with a ball-nose end mill (diameter of ball 15 mm, diameter of shaft 10 mm, overall depth of the recess 19 mm), wherein milling took place from one narrow side to the other narrow side, and the ball of the mill was completely immersed in the material. The graphite foil with a thickness of 2 mm was cut to size with the dimensions 165×3360 mm2 (W×L) and laid onto the base of the slot of the block starting from the longitudinal end. The recess was closed at the longitudinal ends of the block with 100 g of cathode material. Subsequently, the cathode bar was placed in the slot and sealed with 350 kg of cast iron.

REFERENCE SIGNS

1 Cathode block, showing narrow side/end face
2 Slot, filled with cast iron
3 Cathode bar
4 Graphite foil
5, 5' Recess with undercut
6, 6' Side wall of slot
7 Base of the slot
8, 8'; 8" Recess with undercut and shaft
9 Copper
10 Slot radius
11, 11' Start of transition region
12, 12' End of transition region
13 Slot with varying depth

The invention claimed is:

1. Cathode block on the basis of carbon for an electrolysis cell for producing aluminium having at least one slot for receiving at least one cathode bar, wherein the at least one slot has at least one recess extending at least in portions in a longitudinal direction of the at least one slot, the at least one recess having at least one undercut;

wherein the at least one recess having the at least one undercut is defined as a mold which, after the at least one recess has been filled with a liquid metal that is allowed to solidify, results in the solidified metal not being able to be removed from the at least one recess in a non-longitudinal direction without destroying the mold;

wherein the at least one recess is located in one or more of a base of the at least one slot and a slot radius of the at least one slot; and wherein the slot radius of the at least one slot is a transition region between a side wall of the at least one slot and the base of the at least one slot;

wherein the at least one recess extending in the longitudinal direction has the form in cross-section of a circle which is opened toward the at least one slot or of a circle which has a shaft and is opened toward the at least one slot, wherein the opening is configured smaller than the diameter of the circle.

2. Cathode block according to claim 1, wherein in the shaft of the at least one recess, in cross-section, the walls extend parallel or not parallel to one another.

3. Cathode block according to claim 1, wherein the at least one recess extending in the longitudinal direction has an overall depth as viewed over the length of the cathode block, which varies in relation to the base of the at least one slot, and the at least one recess has a smaller overall depth at the longitudinal ends of the cathode block than in the middle of the cathode block.

4. Cathode block according to claim 1, wherein the at least one recess extending in the longitudinal direction has an overall depth of from 5 to 80 mm.

5. Cathode block according to claim 1, wherein the at least one recess is located in the base of the at least one slot.

6. Cathode block according to claim 1, wherein the at least one recess is filled with a combination of conductive metal and cast iron.

7. Cathode block according to claim 6, wherein the at least one recess is at least 50% filled with cast iron.

8. Cathode block according to claim 6, wherein the at least one recess is at least 10% filled with conductive metal.

9. Cathode block according to claim 6, wherein the conductive metal of the filling has the form of a foil.

10. Cathode block according to claim 1, wherein the at least one slot has a varying depth, and the at least one slot has a smaller depth at the longitudinal ends of the cathode block than in the middle of the cathode block.

11. Cathode block according to claim 1, wherein the at least one slot is lined at least in part from the longitudinal ends of the cathode block over ⅓ of the cathode length in each case with a graphite foil.

12. Cathode block according to claim 11, wherein the graphite foil has a thickness of between 0.2 and 3.0 mm.

13. Cathode bottom which contains at least one cathode block according to claim 1.

14. Electrolysis cell, wherein it comprises a cathode bottom according to claim 13.

15. Cathode block according to claim 1, wherein the at least one recess is located in the slot radius of the at least one slot.

16. Cathode block according to claim 1, wherein the at least one recess touches the slot radius of the at least one slot.

17. Cathode block according to claim 1, wherein the at least one recess is filled with cast iron.

18. Cathode block according to claim 6, wherein the conductive metal of the filling has the form of a rod.

* * * * *